Patented Jan. 14, 1947

2,414,290

UNITED STATES PATENT OFFICE 2,414,290

HONEY TREATMENT

Arvid M. Erickson, San Jose, and John D. Ryan, Campbell, Calif., assignors to Barron-Gray Packing Company, San Jose, Calif., a corporation of California No Drawing. Application February 12, 1942, Serial No. 430,614

11 Claims. (Cl. 99—146)

This invention relates to the preparation of an improved sweetening medium. More particularly it is concerned with a method for treating low grade or impure honey.

Commercially available honey varies widely in composition, particularly as respects the impurities present therein. The best grade honey is clear and of a light amber color and is relatively free from any strong odor or flavor and from insoluble solid material, particularly waxy materials. The characteristics of other grades of honey vary gradually down to extremely low grade honeys which are very dark in color and have a strong odor and flavor and contain considerable quantities of impurities, particularly undissolved solid material such as waxes. This extremely low grade honey, due to its characteristics, is practically useless for any purpose and while the utility increases with the grade of the honey up to the highest grade, even the best grade of honey possesses a distinctive odor and flavor which limits its utility as a sweetening medium. Honey is inherently an excellent sweetening medium because the principal sweetening ingredients of the honey are invert or reducing sugars, such as dextrose and levulose, which blend well with sugars naturally occurring in foods and are very easily assimilated by the human body.

It is therefore an object of this invention to prepare a sweetening medium from honey.

A further object of the invention is to provide a method for preparing a sweetening medium from honey which involves removing at least the major portion of the constituents of the honey imparting odor and flavor.

A still further object is to provide a method for treating low grade honey to produce therefrom a product equal or superior to first grade honey as a sweetening medium.

Still another object is to provide a method for treating low grade honey by which the non-sugar solids, together with constituents imparting odor, flavor and color, are largely or substantially completely removed.

Still another object is to provide food products and particularly fruit compositions sweetened with honey from which objectionable non-sugar solids, as well as materials imparting color, odor and flavor, have been largely or substantially completely removed.

A still further object is to provide food products and particularly fruit compositions sweetened with low grade honey which has been refined to eliminate objectionable constituents. Other objects will appear hereinafter.

It has now been found that the foregoing objects may be accomplished by passing the honey into contact with an active form of carbon, such as bone char or activated carbon, to largely or substantially completely eliminate ingredients imparting color, odor and flavor with or without previously treating the honey to remove other constituents depending upon the grade of the honey which is being handled.

If the honey is initially of relatively high grade it has been found in general it may be converted into an excellent sweetening medium simply by treating it with an active form of carbon, such as bone char or activated carbon, which removes the constituents imparting color, odor and flavor, the extent to which these are removed depending upon the quantity of bone char or activated carbon employed and the time of treatment, among other things. The pH of the honey being treated also has a bearing upon the effect of the bone char or active carbon treatment.

The treatment with active carbon may be carried out, for example, by adding to the honey from about 1% to about 3% activated carbon, based on the weight of the dissolved solids in the honey, and then agitating the mixture at elevated temperature of the order of 80° C. for about five minutes. If the honey is initially so thick as to make it difficult to handle it and to distribute the carbon in it, it is preferably diluted with a suitable medium such as water prior to adding the carbon. The quantity of carbon employed may be varied from that set forth above, although this is ordinarily unnecessary. Also the temperature of heating and the time of agitation may vary depending not only upon the nature and quantity of the impurities to be removed but also upon the pH of the honey undergoing treatment. Following the agitation at elevated temperature the active carbon is removed as, for example, by filtration, leaving a sweetening medium or syrup product of high purity, largely or completely free of distinctive color, odor and flavor. Instead of adding the carbon to the honey the intimate contact between the two may be brought about in any other desired manner, as, for example, by filtering the honey through a bed of the carbon, preferably maintaining it at an elevated temperature such as that referred to above.

Where the honey is of a medium grade and contains in addition to ingredients imparting color, odor and flavor a substantial quantity of insoluble non-sugar solid material it is generally preferable to remove the latter material prior to treating the honey with the active carbon or bone char. Thus it has been found that heating honey of medium grade moderately, preferably after dilution with an aqueous medium, causes insoluble, non-sugar solid material, which is undesirable, to precipitate out. This solid material may then be removed by filtering it out with a filtering aid such as diatomaceous earth, or by filtering it in a centrifuge or in any other desired manner, or the solids, if they rise to the top may be skimmed off and if the solids sink to the bottom the clear liquid may be decanted. Preferably after separation of the clear liquid the solids remaining are washed, with water for example, and the washings added to the clear liquid or employed as a diluent for other honey.

The warming and dilution are partially alternatives, at least to the extent that if more heat is used less diluent is required. Both serve to reduce the viscosity of the honey and bring about the separation of the undesired solid material which is largely waxy in nature and generally includes materials which impart a strong odor and flavor, as well as color, to the honey. A suitable aqueous medium for diluting the honey is water. The quantity of the aqueous medium such as water to be added and the temperature to which the honey should be heated cannot be exactly specified however, because these vary with variations in the starting material, particularly as respects viscosity, but also because of the partial alternativeness between the dilution and heating. The amount of water to be added in any given case and the temperature to which to heat the honey will be those which are sufficient to substantially increase the fluidity of the honey and bring about the separation of the undesired solid material. Ordinarily the honey will be heated to a temperature above about 50° C. and below about 100° C. Although lower temperatures may suffice, it has been found that satisfactory results can be consistently obtained by heating the honey to from about 70° C. to about 80° C. Whatever the temperature employed the concentration of the honey for this treatment should be below about 50° Brix.

In the case of honey of very low grade which is highly impure or where a very pure honey product is desired, it has been found preferable to treat the honey chemically for the removal of impurities. To this end the honey, if it has a Brix concentration above about 50°, is preferably diluted, for example with water, to a viscosity or density which facilities handling and ensures completion of the chemical reactions. Preferably the dilution will be sufficient to reduce the Brix concentration below about 50°, i. e. to a concentration of the order of 40° Brix. The honey at the Brix concentration at which it is to be treated has been found to have a pH which is usually about 3.8 to 4.0. This pH is first raised to from about 4.7 to about 5.0 by the addition of a divalent alkaline material such as lime and then a suitable acidic material such as phosphoric acid is added to again reduce the pH to about 4.5. The pH is then again raised with more divalent alkaline material such as lime to from about 6.7 to about 6.9, after which the mixture is preferably heated to boiling for a few minutes, following which the scum is removed and the liquid and solid phases are separated in any desired manner such as by settling or filtration. The separated solids are then washed to recover additional quantities of the clear syrup. A suitable washing medium is water, and the washings may either be added to the main body of syrup or may be employed for diluting fresh quantities of honey.

In the above chemical process for treating honey it will be noted that the acid and alkaline defecating agents are added without an intermediate filtration. It has been found that it is possible to do this because the various reactions are not reversible. It is also possible to add the acid prior to the addition of the alkaline material. This is not a preferred procedure however since it requires greater quantities of the reagents. The addition of some alkaline material prior to the acid is definitely peferable to adding all of the alkaline material after the addition of acid.

While the invention is not intended to be limited to this theory it is believed that the alkaline reagent not only increases the pH but in addition, at the increased pH at least, reacts with the organic non-sugars, particularly the organic acids causing precipitation of undesired impurities. It is further believed however that only one valence of at least a major portion of the alkaline material reacts with the impurities although some alkaline material may react with both valences, and that when the acid is added the acid reacts with the remaining valences of the alkaline reagents causing coagulation and precipitation of the remainder of the impurities. It has been found however that complete precipitation is not usually obtained simply by the addition of the acid, but that it can be obtained by again adding alkaline material to increase the pH substantially to neutrality or just below. Where an ash-forming alkaline material is employed as reagent and the pH is not so increased again it has been observed that some of the alkaline material ordinarily remains in the filtrate, and if present in substantial quantities may give the product an undesirable taste and will usually precipitate out on standing to make the product cloudy. It is quite surprising that the addition of alkaline material aids in eliminating that which is already present.

The addition of water or other diluent prior to adding the reagents is simply for the purpose of reducing the viscosity to make the material easier to handle and to ensure that the reagents will distribute well so that the various reactions may proceed rapidly to completion. The addition of excess quantities of water is not desirable however for the reason that it leads to products which are so dilute as to require concentration to render them suitable for certain uses. Accordingly the preferred amount of water to add is that which is sufficient to facilitate the handling of the liquid and the carrying out of the various reactions. A quantity which reduces the Brix concentration below about 50° is thus ordinarily sufficient.

Instead of adding the diluent first it has been found to be advantageous in many cases to add the alkaline material in the form of an extremely dilute solution so that, when enough of this solution is added to provide the desired quantity of alkaline material, sufficient water is included. This has the advantage not only of eliminating the separate step of diluting the honey but it is also advantageous because it aids in bringing about a quicker and more complete distribution of the alkaline material in the honey thereby avoiding local high concentrations of alkaline material and accelerating the treatment. It is also possible to use, as the diluent, water which is not highly pure so long as the impurities are not undesirable. An illustration of such an aqueous medium is the water derived from washing the final precipitate.

Even though the divalent alkaline material is not added in the form of an extremely dilute solution for the purpose of diluting the honey it is still preferable to add the alkaline material in the form of a relatively dilute aqueous solution or suspension and to thoroughly agitate the honey during and after the addition of the alkaline material. Such fairly dilute solutions would contain an amount of alkaline material of the order of about 6%, by weight.

Suitable alkaline materials with which to increase the pH are alkaline defecating agents, that is, alkaline materials which can be readily eliminated at a later stage of the process and which are capable of precipitating undesired impurities. Divalent alkaline materials and particularly the alkaline earth metal oxides and hydroxides, such as the oxides and hydroxides of barium, calcium and strontium, or the oxide and hydroxide of magnesium, have been found to possess the desired characteristics. The preferred divalent alkaline material is lime, but other divalent alkaline material both organic and inorganic may be used.

The preferred acid with which to reduce the pH to 4.5 and bring about coagulation and precipitattion is phosphoric acid because this acid gives consistently good results in eliminating impurities and does not give undesirable properties to the product, such as bad taste. Other acids may be used for part or all of the acidification but are not preferred because of their inferiority in one respect or another to phosphoric acid. Suitable acidic materials to use are acid defecating agents, that is, any acid which when added in sufficient quantity under the pH conditions specified will bring about the precipitation of impurities without introducing any undesirable radicals which require extra steps or extra care for their elimination. Other suitable acids would include hydrochloric, acetic and sulphuric, but none of these produces such consistently good results as phosphoric acid. The acid such as phosphoric, like the alkaline material, is preferably added in the form of a fairly dilute aqueous solution with agitation of the mixture during and after the addition of the acid. A fairly dilute solution would contain, for example, a quantity of phosphoric acid on the order of about 6%.

Preferably the alkaline material added to increase the pH substantially to neutrality following the addition of the acid is the same alkaline material previously employed. It is also preferable to add this alkaline material in the form of a fairly dilute solution and agitate during its addition. By heating the mixture to boiling following the addition of the alkaline material to substantial neutrality completion of reactions is ensured and flocculation and separation of the precipitate is promoted.

Following the separation of the precipitated solid material in any desired manner, as by filtration, decantation, et cetera, as described above, a clear liquid or clear syrup is obtained which is a highly effective sweetening medium and which, with or without further treatment as described herein, may be used for sweetening purposes. Even though the starting material is an extremely impure honey this clear syrup has a purity and clarity comparable with the very best grades of honey. It does, however, contain honey color and honey flavor to an appreciable degree and where a water-white syrup substantially free of honey flavor and taste is desired it is preferable to treat this syrup with bone char or active carbon as described above. According to one method of treatment, from 1% to 3% of activated carbon calcuated on the weight of the dissolved solids contained in the clear syrup is added to the syrup and the mixture is agitated at 80° C. for a short time of the order of about five minutes. It is then filtered to remove the carbon. The resulting product is substantially water-white and is a highly decolorized, deodorized and deflavorized syrup of very high purity which is suitable for any purpose.

Whether the honey is simply given the treatment with active carbon or is given a more rigorous purification treatment as described above, it may ultimately be concentrated to any desired extent. Where it is to be concentrated it is preferable, but not necessary, that the concentration be carried out after treatment with bone char or active carbon. Usually concentration is not carried far enough to crystallize out any sugar since the syrup form of the sweetening medium is entirely satisfactory for most purposes and is in fact preferable. If a slightly caramelized color appears after concentration the syrup can be again decolorized over the bone char or activated carbon. Concentration is carried out in a conventional manner by evaporation accelerated by the use of heat or any other suitable means. If desired it may be continued to the point where the sugars are deposited out of the solution in crystalline form, although for many purposes this is not necessary or desirable. For example, in making a sweetening medium for a fruit pack, the concentration may be omitted entirely or may be stopped after it has progressed to the point where a moderately thick syrup has been formed which is suitable for the packing of fruit or sweetening of other fruit products.

Although it has been indicated above that the treatment given the honey ordinarily depends largely upon the quality of the honey to be treated, it will be understood that the treatments set forth may be applied to any grade of honey if desired. Thus honey of medium or relatively high grade may be given chemical treatment for removal of impurities or may be diluted and warmed to separate impurities and, if desired, even very low grade honey may be given only the treatment with the active form of carbon or may be given this treatment following dilution and warming. However where a very high grade sweetening medium is required which is of high purity and largely free of the characteristic odor, taste and flavor of honey it is preferable that very low grade honey be given the chemical treatment and that honey of intermediate grade be diluted and warmed to separate solid impurities and that both types be given treatment with active carbon thereafter.

In selecting the treatment to give a particular batch of honey, in addition to considering the initial purity of the honey and the desired final purity, it is also important to bear in mind the fact that purification of the honey by treatment with active carbon and/or by dilution and warming gives a final honey product having a substantially lower pH than the product obtained by the chemical purification method. Whereas the product of chemical purification is ordinarily substantially neutral, that obtained by dilution and warming and/or treatment with an active form of carbon has a distinctly acid pH of the order of about 4.0. For the sweetening of certain fruits, as well as other foods, this acid pH is highly desirable. For example, the sterilization of a food product such as a fruit composition is much more easily carried out where the pH is substantially below neutrality. The treatment with active carbon also is more effective where the honey undergoing treatment is definitely on the acid side of neutrality.

The sweetening media obtained by refining honey as described herein, whether or not they still have to a substantial extent the characteristic color, odor and/or flavor of honey, are excellent materials with which to sweeten food products, particularly fruit compositions, and in fact the purification methods described herein are particularly designed with this in mind. The principal sweetening ingredients in honey are invert or reducing sugars which are obtained when sucrose is inverted, i. e. dextrose and levulose. As is well known these sugars are in many, if not all, respects superior to sucrose as sweetening ingredients for foods for human consumption, particularly since these sugars are more easily assimilated and are in fact the sugars which occur naturally in raw foods, particularly fruits, with the result that they blend better with such foods. Levulose in particular is highly desirable because it has a much higher sweetening power than sucrose. It is a further advantage of the sweetening media produced, as described herein, by refining honey that the sweetening ingredients of the honey are not appreciably affected by the refining process so that they are carried through and are found unchanged in the final product. This is particularly desirable because levulose is generally the predominating sweetening ingredient in honey on a weight basis.

In preparing sweetened food products with sweetening media derived from honey by the process of the present invention these sweetening media are employed alone or with other sugars and with or without dilution or concentration to a particular number of degrees Brix. Thus, fruit nectars may be made by mixing equal parts by volume of a syrup sweetening medium as described herein having a concentration of 15° Brix and a juicy fruit pulp such as for example apricot pulp, pear pulp, plum pulp, nectarine pulp, peach pulp, or mixtures of fruits including a pulpy fruit. The nectar is thereafter preferably sterilized in sealed containers. Canned fruits having an unusually good flavor as well as excellent physical characteristics after extended storage may be prepared with the sweetening media of this invention. Whole or halved and pitted fruits such as apricots, peaches, pears, Royal Anne cherries, or mixtures of fruits including diced or sliced peaches and pears, halved cherries, whole grapes, pineapple tidbits, et cetera, are mixed with about two thirds by volume of a sweetening medium prepared as described herein having a Brix concentration of from about 30° Brix to about 40° Brix and then sterilized in sealed containers. In general it may be said that not only fruits, but food products of all kinds may be sweetened with these sweetening media to advantage in view of the desirable properties of the sweetening ingredients therein. The amount to be employed will depend upon the sweetness desired in the final product. The Brix concentration of the sweetening medium employed in any given case may be adjusted as desired. These new sweetening media are also excellent for sweetening fruit juices which require sweetening, such as for example grapefruit juice, and have the advantage in this connection that they blend with the juice in such a manner as not to impair its quality since they include as sweetening ingredients the same sugars which are found in the juice.

It has been found that in many cases at least, the sweetening media produced as described herein may be used with entire satisfaction for the sweetening of food compositions even though they still have to a substantial extent the characteristic color, odor and flavor of honey. Accordingly the present invention particularly contemplates the preparation of sweetening media which are not free of the characteristic color, odor and flavor of honey and the use of such compositions for sweetening food products, particularly fruit compositions, to any desired extent. A particular advantage of employing as sweetening media products derived from honey and still containing to a substantial extent the color, odor and flavor of honey is that the refining treatment can be shortened somewhat with a consequent saving in time and expense.

It is apparent that many widely different embodiments of this invention may be made without departing from the spirit and scope thereof. Therefore it is not intended to be limited except as indicated in the appended claims.

The invention is hereby claimed as follows:

1. A method of refining honey which comprises heating honey at a concentration below about 50° Brix and containing a substantial quantity of undissolved solid impurities to elevated temperature until the solid impurities separate out and collect together and then separating the solid and liquid phases.

2. A method of refining honey which comprises heating honey at a concentration below about 50° Brix and containing a substantial quantity of undissolved solid impurities to elevated temperature above about 50° C. until the solid impurities separate out and collect together, separating the liquid and solid phases, bringing said liquid phase into intimate contact with from about 1% to about 3%, based on the Brix concentration of the honey, of an active form of carbon at an elevated temperature until the color, odor and flavor are eliminated and then separating the carbon and refined sweetening medium product.

3. In the process of refining honey, the steps which comprise adding separately to the honey an acid defecating agent and an alkaline defecating agent in quantities sufficient to give the honey a pH of about 4.5 and to precipitate impurities.

4. In the process of refining honey, the steps which comprise adding to the honey a quantity of an alkaline defecating agent sufficient to increase the pH of the honey to from about pH 4.7 to about pH 5.0 and react with undesired impurities, then adding an acid defecating agent in a quantity sufficient to materially reduce the pH of the honey to about pH 4.5 and in cooperation with said alkaline material to precipitate out undesired impurities.

5. In the process of refining honey, the steps which comprise adding an alkaline defecating agent to the honey in a quantity sufficient to increase the pH of the honey to from about pH 4.7 to about pH 5.0 and react with undesired impurities, then adding an acid defecating agent in sufficient quantity to reduce the pH of the honey to about pH 4.5 and in cooperation with said alkaline material to precipitate out undesired impurities and thereafter again raising the pH of the mixture with additional quantities of said alkaline material to a pH in the range from about pH 6.7 to about pH 6.9 where still further quantities of impurities are precipitated out and separating the resulting mixture into a clear liquid and insoluble solid materals.

6. In the process of refining honey, the steps which comprise adding to the honey a divalent alkaline defecating agent in sufficient quantity to react with undesired impurities and increase the pH of the composition to from about pH 4.7 to about pH 5.0, then adding an acid defecating agent in sufficient quantity to reduce the pH of the honey to about pH 4.5 and in cooperation with said alkaline material to precipitate out undesired impurities.

7. In the process of refining honey, the steps which comprise adding separately to the honey phosphoric acid and a divalent alkaline defecating agent in quantities sufficient to give the honey a pH of about 4.5 and to precipitate impurities.

8. In the process of refining honey, the steps which comprise adding to the honey a divalent alkaline defecating agent in a quantity sufficient to react with undesired impurities and increase the pH of the honey to a pH within the range from about pH 4.7 to about pH 5.0, then adding phosphoric acid in sufficient quantity to reduce the pH of the composition to about pH 4.5 and in cooperation with said alkaline material to precipitate out undesired impurities and thereafter again raising the pH of the mixture with additional quantities of said divalent alkaline material to a pH in the range from about pH 6.7 to about pH 6.9 where still further quantities of impurities are precipitated out, heating the mixture at this pH to a boil to complete the formation of the precipitate and then separating the resulting mixture into a clear liquid and insoluble solid material.

9. In the process of refining honey, the steps which comprise adding lime to the honey in a quantity sufficient to react with undesired impurities and increase the pH of the honey to a pH within the range from about pH 4.7 to about pH 5.0, then adding phosphoric acid in sufficient quantity to reduce the pH of the composition to about pH 4.5 and in cooperation with said lime to precipitate out undesired impurities and thereafter again raising the pH of the mixture with additional quantities of said lime to a pH in the range from about pH 6.7 to about pH 6.9 where still further quantities of impurities are precipitated out, heating the mixture at this pH to a boil to complete the formation of this precipitate and then separating the resulting mixture into a clear liquid and insoluble solid materials.

10. The process of refining honey which comprises adding dilute aqueous lime to honey having a Brix concentration below about 50°, said dilute aqueous lime being added in a quantity sufficient to react with undesired impurities and increase the pH of the composition to a pH within the range from about pH 4.7 to about pH 5.0, thereafter adding a dilute aqueous solution of phosphoric acid in an amount sufficient to reduce the pH of the composition to about pH 4.5 and in cooperation with said lime to precipitate out undesired impurities and thereafter again raising the pH of the mixture with additional quantities of aqueous lime to a pH in the range from about pH 6.7 to about pH 6.9 where still further quantities of impurities are precipitated out, heating the mixture at this pH to a boil for about five minutes to complete the formation of the precipitate then removing the scum and separating the resulting mixture into a clear liquid and insoluble solid materials, then adding to the clear liquid from about 1% to about 3% of activated carbon, based on the weight of dissolved solids in the clear liquid, and agitating the mixture of clear liquid and carbon at 80° C. for about five minutes and then separating the clear liquid and the carbon.

11. A method of refining honey which comprises heating honey at a concentration below about 50° Brix and containing a substantial quantity of undissolved solid impurities to elevated temperature in the absence of filtering material until the solid impurities separate out and collect together and then separating the solid and liquid phases.

ARVID M. ERICKSON.
JOHN D. RYAN.